(12) United States Patent
Lee et al.

(10) Patent No.: US 8,016,447 B2
(45) Date of Patent: Sep. 13, 2011

(54) BACKLIGHT UNIT AND LIQUID CRYSTAL DISPLAY USING THE SAME

(75) Inventors: Seunghwan Lee, Goyang-si (KR); Hyunson Chon, Seoul (KR); Taeuk Kang, Seoul (KR); Namchul Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 361 days.

(21) Appl. No.: 12/474,893

(22) Filed: May 29, 2009

(65) Prior Publication Data

US 2010/0123852 A1 May 20, 2010

(30) Foreign Application Priority Data

Nov. 17, 2008 (KR) .................. 10-2008-0114133

(51) Int. Cl.
*G02F 1/13357* (2006.01)

(52) U.S. Cl. ..................... 362/97.2; 362/97.1

(58) Field of Classification Search .................. 362/97.1, 362/97.2
See application file for complete search history.

(56) References Cited

U.S. PATENT DOCUMENTS

| 7,407,318 | B2 * | 8/2008 | Chang | 362/632 |
| 2005/0073858 | A1 * | 4/2005 | Kim et al. | 362/561 |
| 2010/0002417 | A1 * | 1/2010 | Chiu et al. | 362/97.1 |

\* cited by examiner

*Primary Examiner* — David V Bruce
(74) *Attorney, Agent, or Firm* — Birch, Stewart, Kolasch & Birch, LLP

(57) ABSTRACT

A backlight unit and a liquid crystal display using the same are provided. The backlight unit includes a plurality of lamps, a first balance printed circuit board (PCB) that commonly supplies a high voltage AC signal to electrodes at one side of each of the lamps, a second balance PCB that commonly supplies the high voltage AC signal to electrodes at the other side of each of the lamps, and a bottom cover that receives the lamps and the first and second balance PCBs. A plurality of vibration absorbing holes are formed in an area where the first and second balance PCBs are formed.

14 Claims, 6 Drawing Sheets

BACKLIGHT UNIT AND LIQUID CRYSTAL DISPLAY USING THE SAME

This application claims the benefit of Korea Patent Application No. 10-2008-114133 filed on Nov. 17, 2008, the entire contents of which is incorporated herein by reference for all purposes as if fully set forth herein.

BACKGROUND OF THE INVENTION

1. Field of the Invention

Embodiments of the invention relate to a backlight unit capable of reducing a vibration of components affected by a vibration of lamps and a noise resulting from the vibration of the components and a liquid crystal display using the same.

2. Discussion of the Related Art

An application range of liquid crystal displays (LCDs) has showed a tendency to gradually increase because of characteristics such as thin profile, lightness in weight, and low power consumption of the liquid crystal displays. According to the tendency, the liquid crystal displays have been used in office automation equipment, audio/video equipment, and the like. The liquid crystal displays display a desired image on the screen by controlling an amount of light depending on a video signal applied to a plurality of control switches arranged in a matrix format.

Because the liquid crystal display is not a self-emission display device, the liquid crystal display needs a light source such as a backlight unit. The backlight unit is mainly classified into a direct type backlight unit and an edge type backlight unit. In the edge type backlight unit, a light source is positioned outside a liquid crystal display panel, and light from the light source is incident on the entire surface of the liquid crystal display panel using a transparent light guide plate. In the direct type backlight unit, a light source is positioned in the rear of a liquid crystal display panel, and light from the light source is directly incident on the entire surface of the liquid crystal display panel. In the direct type backlight unit, a luminance can be improved and an emitting surface can be increased because a plurality of light sources are used. Accordingly, the direct type backlight unit is used in a LCD TV needing a large-sized liquid crystal display panel.

A related art direct type backlight unit includes a plurality of lamps irradiating light onto a liquid crystal display panel, a lamp guide supporting the lamps, a bottom cover receiving the lamps and the lamp guide, a diffusion plate that is positioned on the lamps to diffuse light coming from the lamps, and a plurality of optical sheets that are stacked on the diffusion plate and change a traveling path of light from the diffusion plate in a direction vertical to the liquid crystal display panel.

The lamp guide includes lamp holders and a fame member. The lamp holders are supported by the frame member fastened to the bottom cover and fix the lamps on the bottom cover. A diffusion plate supporter is fastened to the fame member and prevents the diffusion plate from hanging down by heat of the lamps. A reflective sheet is attached to an inner wall surface of the bottom cover and reflects light travelling from the lamps to the bottom cover on the liquid crystal display panel. Hence, an efficiency of light incident on the liquid crystal display panel increases.

The lamps use a cold cathode fluorescent lamp (CCFL) or an external electrode fluorescent lamp (EEFL). In particular, a high-high manner, in which the lamps are parallel-driven by applying a high voltage AC signal to both sides of each of the lamps, has been recently proposed so as to reduce a volume of a large-sized LCD TV occupied by a backlight unit. In the high-high manner, balance printed circuit boards (PCBs) are respectively positioned at both sides of the lamps, and ends of the lamps are commonly connected to the balance PCBs. The high voltage AC signal is generated by an inverter PCB and then is supplied to the lamps through the balance PCBs. An emitting luminance of the lamps is determined by the inverter output signal of which a duty ratio varies by a burst dimming signal from a dimming circuit.

However, in case the lamps operate based on the inverter output signal, rapid energy changes are periodically generated in electrodes at both sides of the lamps due to the intermittently applied high voltage AC signal. As a result, the lamps slightly vibrate. The slight vibration of the lamps affects the balance PCBs commonly connected to the electrodes of the lamps. In other words, when a vibration frequency of the lamps is equal to a natural vibration frequency of the balance PCBs, the balance PCBs are resonated to generate a loud noise. The noise occurs louder in a front surface of the liquid crystal display than a back surface of the liquid crystal display completely covered by a back cover. In particular, the noise resulting from the vibration has gradually increased because of an increase in the number of lamps according to large size and thin profile of the liquid crystal display, an increase in a contact area between the electrodes and a structure of the lamps, and an increases in the inverter output signal for parallel-driving the lamps.

A transformer and a plurality of passive elements are mounted on the inverter PCB, and the transformer and the passive elements are protected from an external environment by fastening a shield cover shielding the inverter PCB to the inverter PCB. The shield cover is aligned through a plurality of L-shaped flanges guided by projections projecting from a back surface of the bottom cover and then is fixed on the back surface of the bottom cover by a screw coupling. However, because the flange is used to align the shield cover, bending angle of the flange is same before and after the shield cover is fastened to the bottom cover. Therefore, the flange is not firmly attached to the back surface of the bottom cover when the shield cover is fastened to the bottom cover. The bending shape of the flange is easily affected by the vibration of the lamps and thus causes a vibration of the shield cover. Hence, a noise results from the vibration of the shield cover.

SUMMARY OF THE INVENTION

Embodiments of the invention provide a backlight unit capable of reducing a vibration of components affected by a vibration of lamps and a noise resulting from the vibration of the components and a liquid crystal display using the same.

In one aspect, there is a backlight unit comprising a plurality of lamps, a first balance printed circuit board (PCB) that commonly supplies a high voltage AC signal to electrodes at one side of each of the lamps, a second balance PCB that commonly supplies the high voltage AC signal to electrodes at the other side of each of the lamps, and a bottom cover that receives the lamps and the first and second balance PCBs and has a plurality of vibration absorbing holes formed in an area where the first and second balance PCBs are formed.

In another aspect, there is a liquid crystal display comprising a backlight unit including a plurality of lamps, a first balance PCB that commonly supplies a high voltage AC signal to electrodes at one side of each of the lamps, a second balance PCB that commonly supplies the high voltage AC signal to electrodes at the other side of each of the lamps, and a bottom cover that receives the lamps and the first and second balance PCBs and has a plurality of vibration absorbing holes formed in an area where the first and second balance PCBs are formed, and a liquid crystal display panel that displays an image using light from the backlight unit.

A cross-sectional shape of the vibration absorbing holes is one of a circle, a triangle, a quadrilateral, a polygon, and an oval shapes.

The backlight unit further comprises a first inverter PCB that is connected to the first balance PCB through a first lamp wire and generates the high voltage AC signal, a first shield cover that shields the first inverter PCB, a second inverter PCB that is connected to the second balance PCB through a second lamp wire and generates the high voltage AC signal, and a second shield cover that shields the second inverter PCB, wherein each of the first and second shield covers has a bending flange and is fastened to a back surface of the bottom cover, wherein the flanges are respectively integrated with the first and second shield covers, wherein an inner angle of the flange at a bending position of the flange before the first and second shield covers are fastened to the back surface of the bottom cover is greater than an inner angle of the flange at the same position after the first and second shield covers are fastened to the back surface of the bottom cover by a predetermined angle.

The predetermined angle is 4° to 5°.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
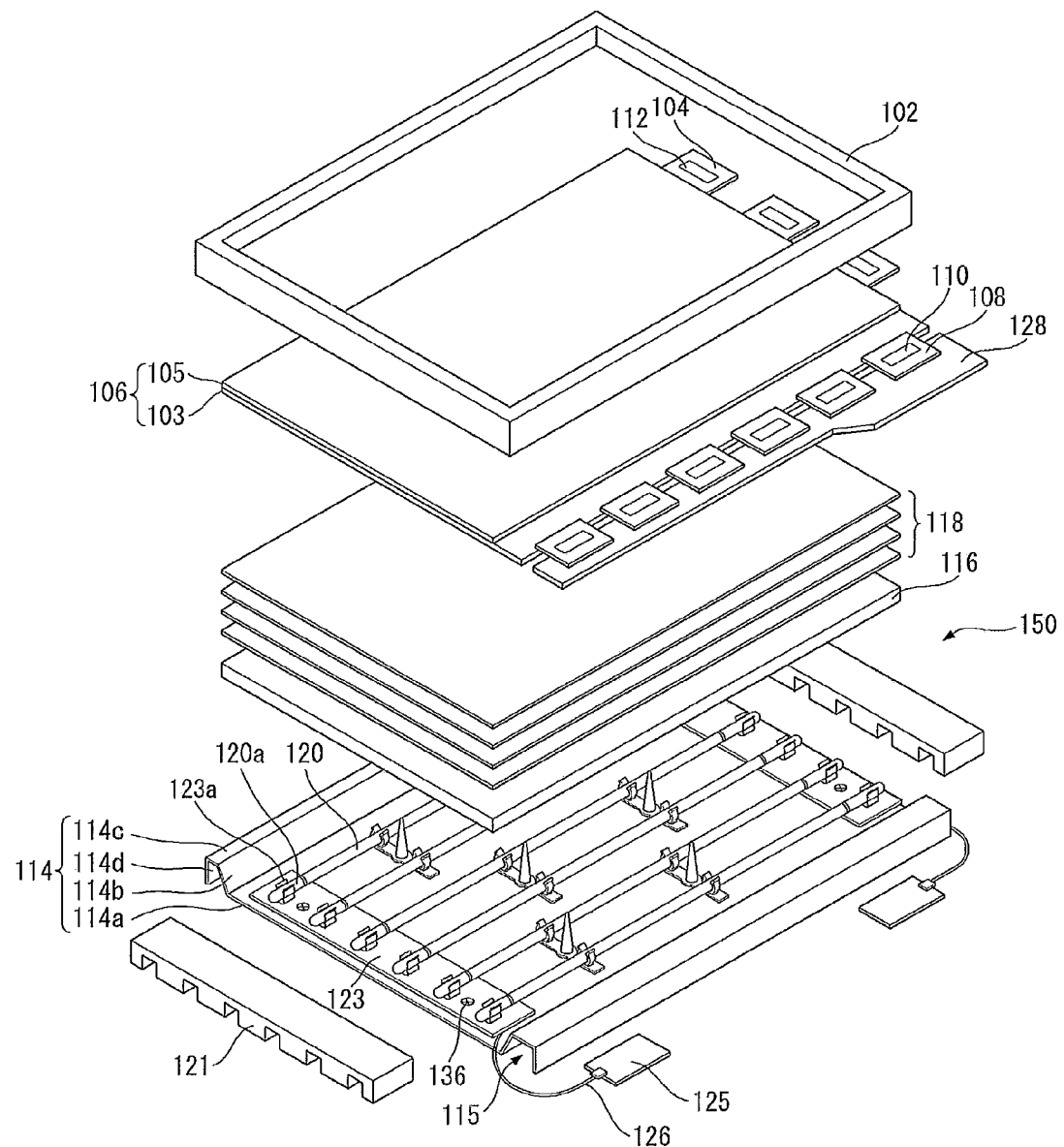
FIG. 1 is an exploded perspective view of a liquid crystal display according to an embodiment of the invention.
Figure 2:
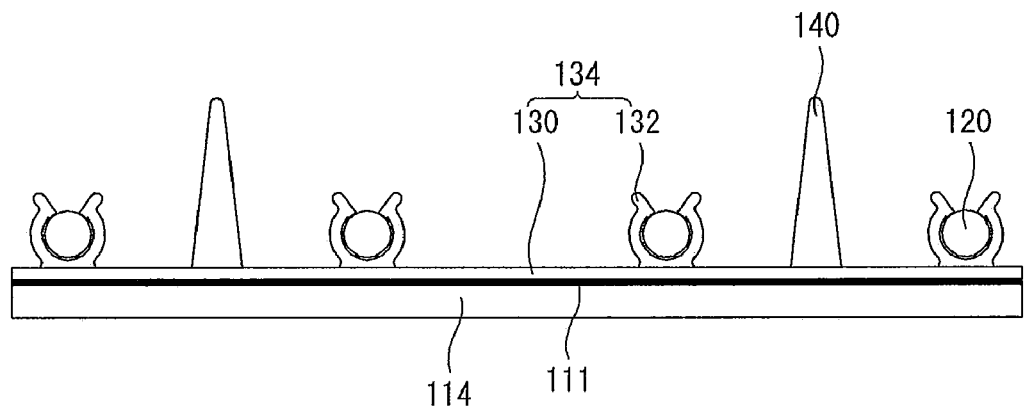
FIG. 2 is a cross-sectional view of lamps fastened to a lamp guide.
Figure 3:
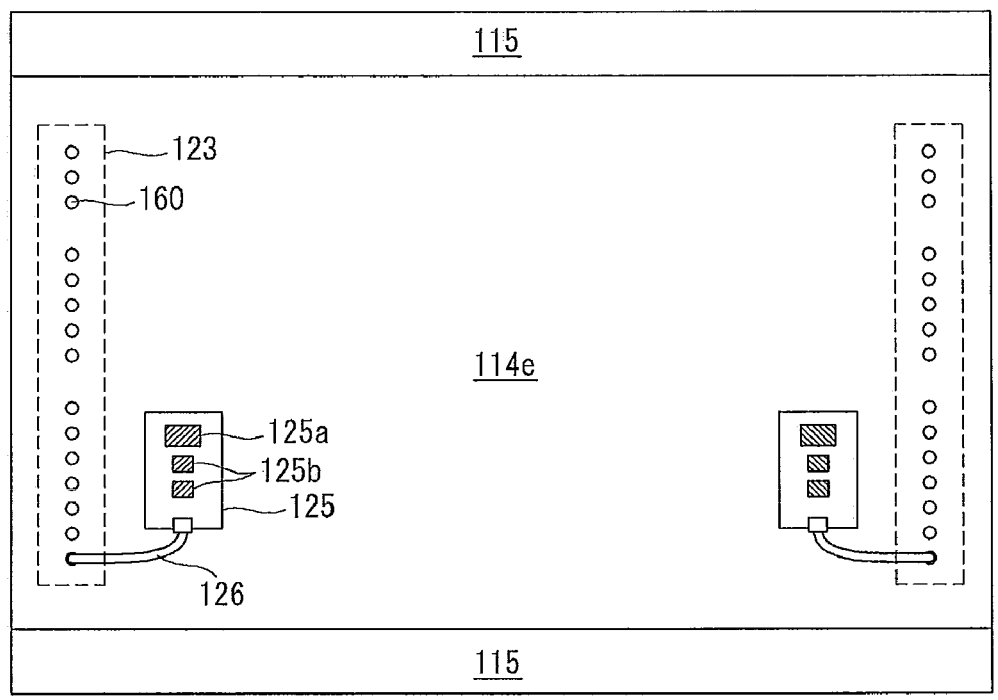
FIG. 3 is a plane view showing a back surface of a bottom cover on which vibration absorbing holes are formed.
Figure 4A:
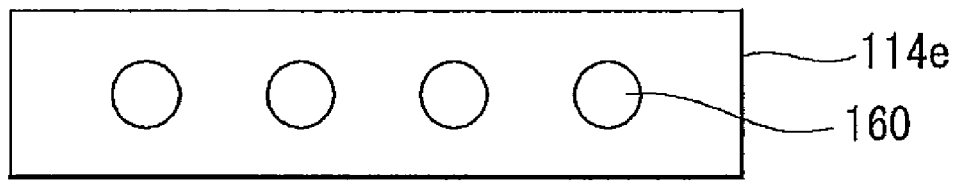
FIGS. 4A to 4E illustrate various cross-sectional shapes of vibration absorbing holes.
Figure 4B:
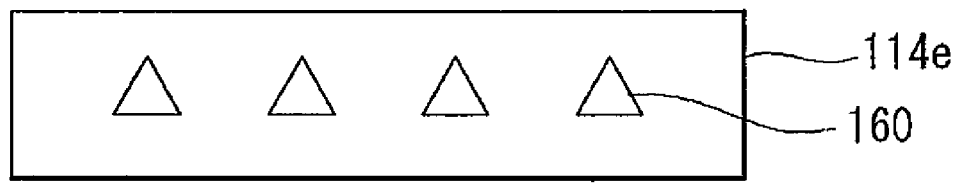
Figure 4C:
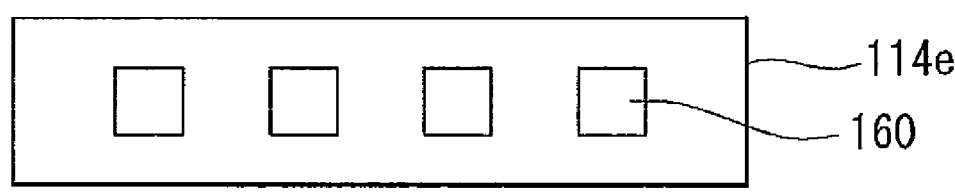
Figure 4D:
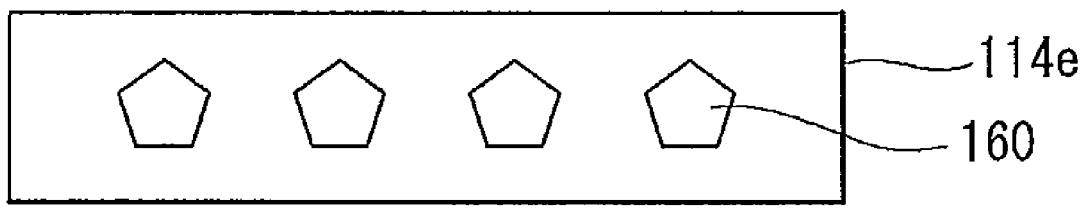
Figure 4E:
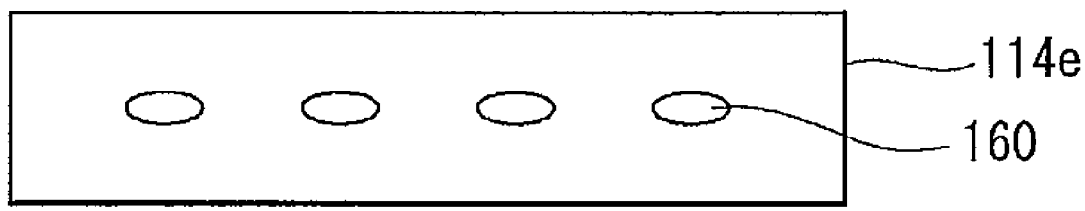
Figure 5:
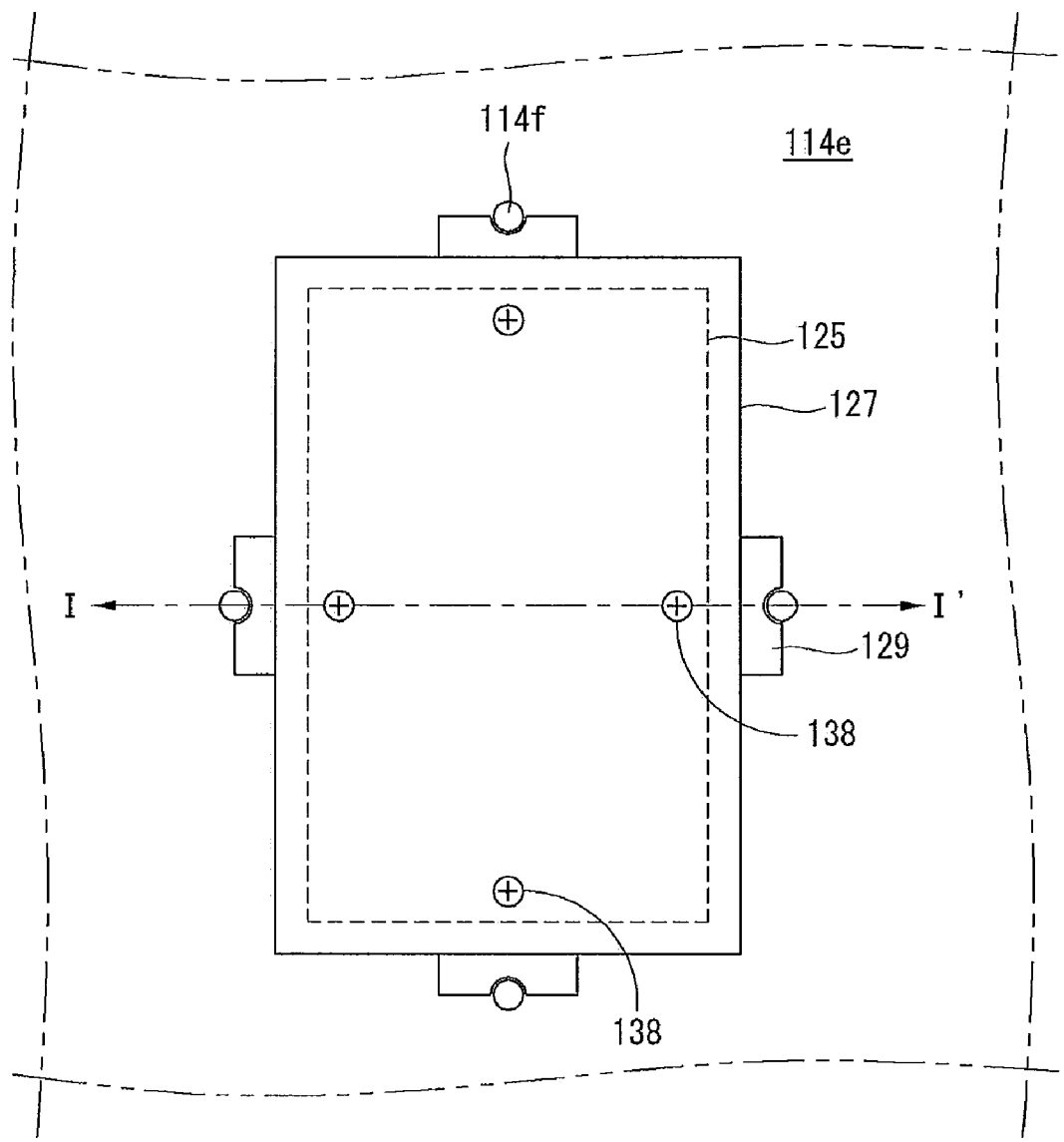
FIG. 5 is a plane view showing an inverter printed circuit board (PCB) covered by a shield cover.
Figure 6:
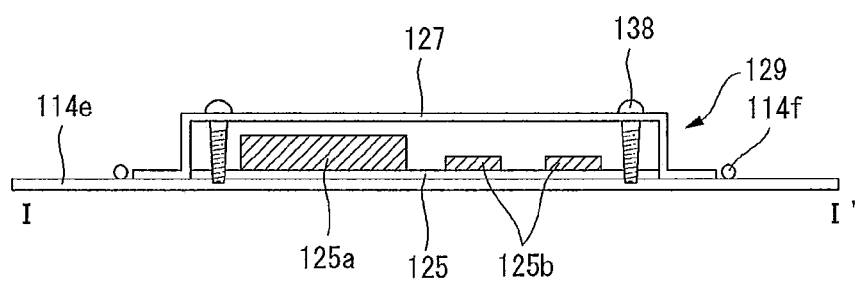
FIG. 6 is a cross-sectional view taken along line □-□' of FIG. 5.
Figure 7:
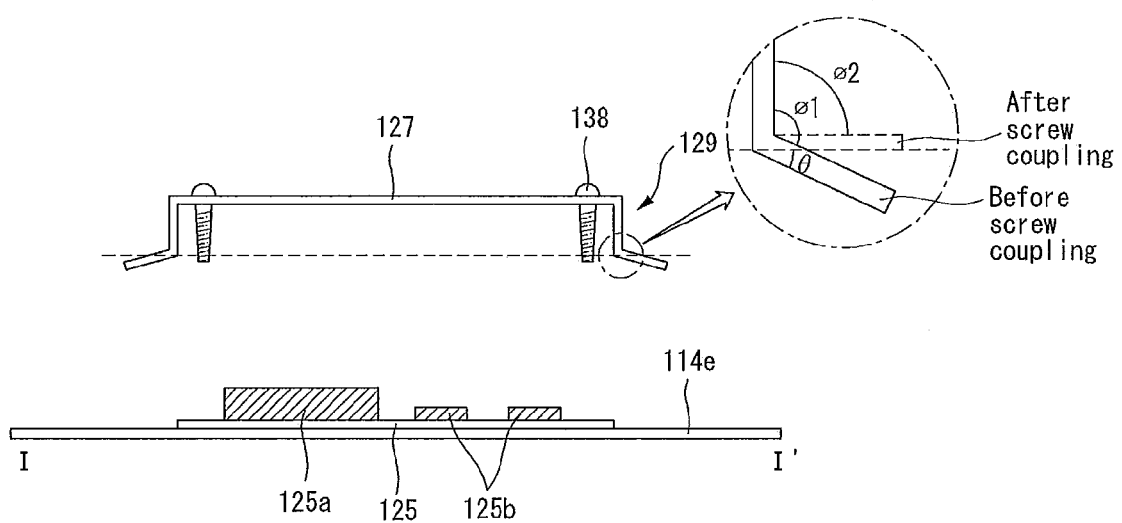
FIG. 7 illustrates a bending angle of a flange integrated with a shield cover.

FIG. 1 is an exploded perspective view of a liquid crystal display according to an embodiment of the invention. FIG. 2 is a cross-sectional view of lamps fastened to a lamp guide. FIG. 3 is a plane view showing a back surface of a bottom cover on which vibration absorbing holes are formed. FIGS. 4A to 4E illustrate various cross-sectional shapes of vibration absorbing holes. FIG. 5 is a plane view showing an inverter printed circuit board (PCB) covered by a shield cover. FIG. 6 is a cross-sectional view taken along line □-□' of FIG. 5. FIG. 7 illustrates a bending angle of a flange integrated with a shield cover.

As shown in FIG. 1, the liquid crystal display according to the embodiment of the invention includes a top case 102, a liquid crystal display panel 106, a backlight unit 150, and an inverter PCB 125.

The top case 102 has a quadrilateral frame structure bended to surround edges of the liquid crystal display panel 106.

The liquid crystal display panel 106 includes an upper substrate 105 and a lower substrate 103. Liquid crystals drop between the upper substrate 105 and the lower substrate 103. A column spacer is formed between the upper substrate 105 and the lower substrate 103 to keep a distance between the upper substrate 105 and the lower substrate 103 constant.

A color filter, a common electrode, a black matrix, etc. are formed on the upper substrate 105 of the liquid crystal display panel 106. The common electrode may be formed on the lower substrate 103 depending on an electric field driving manner. Data lines, gate lines, and a thin film transistor (TFT) at each of crossings of the data lines and the gate lines are on the lower substrate 103. The TFTs switch data signals, which will be transferred from the data lines to liquid crystal cells, in response to scan signals (gate pulses) received through the gate lines. A pixel electrode is formed in a pixel portion between the data line and the gate line.

Data pads connected to the data lines and gate pads connected to the gate lines are formed at one side of the liquid crystal display panel 106. A plurality of tape carrier packages (TCPs) 104 and 108 are attached in a formation area of the data pads and the gate pads at a constant distance from one another. The TCP 104 is a gate TCP 104 on which a gate drive integrated circuit (IC) 112 is mounted, and the TCP 108 is a data TCP 108 on which a data drive IC 110 is mounted. The data drive IC 110 is attached to the data pad on the lower substrate 103 and a source PCB 128 which supplies a video signal to the data lines of the liquid crystal display panel 106. The data drive IC 110 supplies the video signal to the data lines in response to a control signal received from the source PCB 128. The gate drive IC 112 is attached to the gate pad on the lower substrate 103 and supplies the gate pulse to the gate lines in response to a control signal received from the source PCB 128.

The backlight unit 150 includes a plurality of lamps 120, side supports 121, a bottom cover 114, a diffusion plate 116, and a plurality of optical sheets 118. The plurality of lamps 120 are positioned parallel to one another and irradiate light onto the liquid crystal display panel 106. The side supports 121 cover edges of the lamps 120, and the lamps 120 are inserted into the side supports 121. The bottom cover 114 is positioned on back surfaces of the lamps 120 and receives the lamps 120. The diffusion plate 116 covers the entire surface of the bottom cover 114 and diffuses light coming from the lamps 120 to irradiate the light onto the liquid crystal display panel 106. The plurality of optical sheets 118 are stacked on the diffusion plate 116 and change a traveling path of light from the diffusion plate 116 in a direction vertical to the liquid crystal display panel 106.

As the lamps 120, external electrode fluorescent lamps (EEFLs) having external electrodes 120a projected from both ends of each of the lamps 120 may be used. Each of the lamps 120 includes a glass tube, inert gases inside the glass tube, and electrodes at both sides of the glass tube. An inner space of the glass tube is filled with the inert gases, and an inner wall of the glass tube is coated with a phosphor.

The lamps 120 may be implemented by paralleled cold cathode fluorescent lamps (CCFLs). Because electrodes of the CCFL are formed inside a glass tube, a plurality of balance capacitors connected to each of both ends of each of the lamps 120 through a connector and a balance board, on which the balance capacitors are mounted, are necessary to commonly apply a high voltage AC signal to the lamps 120. The balance capacitors serve as an external electrode and are commonly connected to one another on the balance board. It is assumed that the lamps 120 use the EEFL for the convenience of explanation in the embodiment.

The external electrodes 120a of each of the lamps 120 are commonly connected to each other on the balance PCB 123 and commonly receive the high voltage AC signal through the balance PCB 123. The balance PCB 123 has metal clips 123a elastically pressurizing the external electrodes 120a, so that the lamps 120 are inserted into the balance PCB 123. The metal clips 123a may be electrically connected to one another through signal transmission lines. For example, the metal clips 123a are automatically safely received through a surface mount technology (SMT) and are soldered, so that the metal clips 123a are electrically connected to the signal transmission lines formed on the balance PCB 123. The signal transmission lines on the balance PCB 123 are connected to a lamp wire 126 and supply the high voltage AC signal received from the inverter PCB 125 through the lamp wire 126 to the metal clips 123a. It is preferable that the lamp wire 126 is covered with an insulation tube so as to minimize a leakage amount of signal in a signal transmission. The balance PCB 123 is fastened to the bottom cover 114 through a screw 136. The two balance PCBs 123 are provided. So, one balance PCB 123 connects the external electrodes 120a of one side of the lamps 120 to one another, and the other balance PCB 123 connects the external electrodes 120a of the other side of the lamps 120 to one another. Hence, both sides of each of the lamps 120 receive the high voltage AC signal and thus can be parallel-driven in a high-high manner. In case the lamps 120 are parallel-driven as described above, the high voltage AC signal is intermittently applied to the external electrodes 120a at both sides of each of the lamps 120. Hence, the lamps 120 slightly vibrate because rapid energy changes are periodically generated in the lamps 120. The slight vibration of the lamps 120 affects the balance PCBs 123.

The bottom cover 114 has a first surface 114a on which the lamps 120 and the balance PCBs 123 are mounted, a second surface 114b that bends obliquely to the first surface 114a and extends from the first surface 114a, a third surface 114c that is parallel to the first surface 114a by bending from the second surface 114b and extending from the second surface 114b, and a fourth surface 114d that bends vertically to the third surface 114c and extends opposite the second surface 114b. As shown in FIG. 3, a plurality of vibration absorbing holes 160 are formed in a formation portion of the balance PCBs 123 in the first surface 114a of the bottom cover 114, so as to prevent the balance PCBs 123 from vibrating due to the slight vibration of the lamps 120. The vibration absorbing holes 160 weaken the slight vibration of the lamps 120 transferred to the balance PCBs 123 through the first surface 114a of the bottom cover 114. A cross-sectional shape of the vibration absorbing holes 160 may be one of a circle shape shown in FIG. 4A, a triangle shape shown in FIG. 4B, a rectangular shape shown in FIG. 4C, a polygon shape shown in FIG. 4D, and an oval shape shown in FIG. 4E. Other shapes may be used for the vibration absorbing holes 160. The second to fourth surfaces 114b, 114c, and 114d of the bottom cover 114 are formed at both longer sides of the bottom cover 114 parallel to the lamps 120, and both shorter sides of the bottom cover 114 vertical to the lamps 120 are open. The second to fourth surfaces 114b, 114c, and 114d form a concave space 115 at both longer sides of the bottom cover 114. The side supporter 121 is fastened to both shorter sides of the bottom cover 114. The side supporter 121 has insertion portions into which the lamps 120 are inserted and supports the lamps 120 at both shorter sides of the bottom cover 114. A lamp guide 134, as shown in FIG. 2, is fastened to the first surface 114a of the bottom cover 114 so as to prevent the lamps 120 from hanging down. The lamp guide 134 includes a frame member 130 and a lamp holder 132. The lamp holder 132 is supported by the frame member 130 fastened to the bottom cover 114 and fixes the lamps 120 on the bottom cover 114. A diffusion plate supporter 140 is fastened to the frame member 130 to prevent the diffusion plate 116 from hanging down due to heat of the lamps 120. A reflective sheet 111 is attached to an inner wall surface of the bottom cover 114. The reflective sheet 111 reflects light traveling from the lamps 120 to the bottom cover 114 on the liquid crystal display panel 106 and thus improves the efficiency of light incident on the liquid crystal display panel 106.

The diffusion plate 116 diffuses light from the lamps 120 and thus allows a distribution density of light incident on the liquid crystal display panel 106 to be uniform. The plurality of optical sheets 118 on the diffusion plate 116 changes a traveling path of light from the diffusion plate 116 in a direction vertical to the liquid crystal display panel 106 and thus improve the efficiency of light. The optical sheets 118 include at least one prism sheet and at least one diffusion sheet.

As shown in FIG. 3, the inverter PCB 125 includes a transformer 125a and a plurality of passive elements 125b. The inverter PCB 125 generates the high voltage AC signal required to drive the lamps 120 and then supplies the high voltage AC signal to the balance PCB 123 through the lamp wire 126. As shown in FIGS. 5 and 6, a shield cover 127 is fastened to the inverter PCB 125 to protect the transformer 125a and the passive elements 125b from an external environment. The inverter PCB 125 and the shield cover 127 are fastened to a back surface 114e of the bottom cover 114 through a screw 138. The shield cover 127 is generally aligned through a plurality of L-shaped flanges 129 guided by projections 114f projected from the back surface 114e of the bottom cover 114 and then is fixed on the back surface 114e of the bottom cover 114 by a screw coupling using the screw 138. The flanges 129 are integrated with the shield cover 127 and bend. The L-shaped flange 129 has a structure in which an inner angle of the flange 129 before the screw coupling at a bending position of the flange 129 is greater than an inner angle of the flange 129 after the screw coupling at the same position, so that the shield cover 127 is prevented from vibrating because of an influence of the slight vibration of the lamps 120. More specifically, as shown in FIG. 7, an inner angle φ1 of the flange 129 before the screw coupling is greater than an inner angle φ2 of the flange 129 after the screw coupling by a predetermined angle θ. It is preferable that the predetermined angle θ is 4° to 5° in consideration of an adhesion strength and the easy screw coupling. When the predetermined angle θ is smaller than 4°, an adhesion level between the flange 129 and the back surface 114e of the bottom cover 114 is reduced in the screw coupling of the shield cover 127 and the bottom cover 114. When the predetermined angle θ is greater than 5°, it is difficult to fasten the shield cover 127 to the bottom cover 114.

As described above, in the backlight unit according to the embodiment of the invention and the liquid crystal display using the same, because the plurality of vibration absorbing holes are formed in a formation portion of the balance PCB in the bottom cover, the slight vibration of the lamps can be prevented from being transferred to the balance PCB through the bottom cover. Hence, in the embodiment of the invention, a loud noise resulting from the vibration of the related art balance PCB can be efficiently prevented.

Furthermore, in the backlight unit according to the embodiment of the invention and the liquid crystal display using the same, because the inner angle of the flange integrated with the shield cover before the screw coupling is greater than the inner angle of the flange after the screw coupling by a predetermined angle, an adhesion level between the flange and the back surface of the bottom cover can increase. Further, the shield cover can be prevented from vibrating because of the slight vibration of the lamps.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a plurality of lamps;
   a first balance printed circuit board (PCB) that commonly supplies a high voltage AC signal to electrodes at one side of each of the lamps;
   a second balance PCB that commonly supplies the high voltage AC signal to electrodes at the other side of each of the lamps; and
   a bottom cover that receives the lamps and the first and second balance PCBs and has a plurality of vibration absorbing holes formed in an area where the first and second balance PCBs are formed.

2. The backlight unit of claim 1, wherein a cross-sectional shape of the vibration absorbing holes is one of a circle, a triangle, a quadrilateral, a polygon, and an oval shapes.

3. The backlight unit of claim 1, further comprising:
   a first inverter PCB that is connected to the first balance PCB through a first lamp wire and generates the high voltage AC signal;
   a first shield cover that shields the first inverter PCB;
   a second inverter PCB that is connected to the second balance PCB through a second lamp wire and generates the high voltage AC signal; and
   a second shield cover that shields the second inverter PCB.

4. The backlight unit of claim 3, wherein each of the first and second shield covers has a bending flange fastened to a back surface of the bottom cover.

5. The backlight unit of claim 4, wherein the flanges are integrated with the first and second shield covers, respectively.

6. The backlight unit of claim 5, wherein an inner angle of the flange at a bending position of the flange before the first and second shield covers are fastened to the back surface of the bottom cover is greater than an inner angle of the flange at the same position after the first and second shield covers are fastened to the back surface of the bottom cover by a predetermined angle.

7. The backlight unit of claim 6, wherein the predetermined angle is 4° to 5°.

8. A liquid crystal display comprising:
   a backlight unit including a plurality of lamps, a first balance printed circuit board (PCB) that commonly supplies a high voltage AC signal to electrodes at one side of each of the lamps, a second balance PCB that commonly supplies the high voltage AC signal to electrodes at the other side of each of the lamps, and a bottom cover that receives the lamps and the first and second balance PCBs and has a plurality of vibration absorbing holes formed in an area where the first and second balance PCBs are formed; and a liquid crystal display panel that displays an image using light from the backlight unit.

9. The liquid crystal display of claim 8, wherein a cross-sectional shape of the vibration absorbing holes is one of a circle, a triangle, a quadrilateral, a polygon, and an oval shapes.

10. The liquid crystal display of claim 8, wherein the backlight unit further includes:
    a first inverter PCB that is connected to the first balance PCB through a first lamp wire and generates the high voltage AC signal;
    a first shield cover that shields the first inverter PCB;
    a second inverter PCB that is connected to the second balance PCB through a second lamp wire and generates the high voltage AC signal; and
    a second shield cover that shields the second inverter PCB.

11. The liquid crystal display of claim 10, wherein each of the first and second shield covers has a bending flange fastened to a back surface of the bottom cover.

12. The liquid crystal display of claim 11, wherein the flanges are respectively integrated with the first and second shield covers.

13. The liquid crystal display of claim 12, wherein an inner angle of the flange at a bending position of the flange before the first and second shield covers are fastened to the back surface of the bottom cover is greater than an inner angle of the flange at the same position after the first and second shield covers are fastened to the back surface of the bottom cover by a predetermined angle.

14. The liquid crystal display of claim 13, wherein the predetermined angle is 4° to 5°.

* * * * *